(12) United States Patent
Linhoff (10) Patent No.: US 9,016,804 B2
(45) Date of Patent: Apr. 28, 2015

(54) BRAKE SYSTEM FOR A MOTOR VEHICLE AND METHOD FOR OPERATING A BRAKE SYSTEM

(75) Inventor: Paul Linhoff, Neu-Anspach (DE)

(73) Assignee: Continental Teves AG & Co. OHG (DE)

( * ) Notice: Subject to any disclaimer, the term of this patent is extended or adjusted under 35 U.S.C. 154(b) by 111 days.

(21) Appl. No.: 13/643,642

(22) PCT Filed: Apr. 27, 2011

(86) PCT No.: PCT/EP2011/056637
§ 371 (c)(1),
(2), (4) Date: Oct. 26, 2012

(87) PCT Pub. No.: WO2011/134987
PCT Pub. Date: Nov. 3, 2011

(65) Prior Publication Data
US 2013/0169032 A1    Jul. 4, 2013

(30) Foreign Application Priority Data

Apr. 27, 2010 (DE) .......................... 10 2010 028 261

(51) Int. Cl.
*B60T 13/74* (2006.01)
*B60T 13/58* (2006.01)
*B60L 7/26* (2006.01)
(Continued)

(52) U.S. Cl.
CPC .................. *B60T 13/586* (2013.01); *B60L 7/26* (2013.01); *B60T 8/267* (2013.01); *B60T 8/4872* (2013.01); *B60T 8/5081* (2013.01); *B60T 2270/604* (2013.01); *B60T 13/148* (2013.01)

(58) Field of Classification Search
USPC ........... 303/3, 20, 113.1, 113.2, 115.1, 115.4, 303/115.5, 116.2, 116.3, 119.1, 152, 303/DIG. 3, DIG. 11
See application file for complete search history.

(56) References Cited

U.S. PATENT DOCUMENTS 5,769,509 A    6/1998  Feigel et al.
5,853,229 A   12/1998  Willmann et al.
(Continued)

FOREIGN PATENT DOCUMENTS

DE      196 04 134 A1   8/1997
DE   10 2004 027 256 A1  1/2005
(Continued)

OTHER PUBLICATIONS

International Search Report for PCT Application No. PCT/EP2011/056637 mailed Jul. 27, 2011.
(Continued)

*Primary Examiner* — Pamela Rodriguez
(74) *Attorney, Agent, or Firm* — RatnerPrestia (57) ABSTRACT

A brake system for a motor vehicle includes on at least one wheel, an electric-regenerative brake and a friction brake that can be hydraulically actuated by a first generator of brake pressure using a fluid, wherein the friction brake can be connected via an actuatable inlet valve to the first generator of brake pressure and via a first actuatable outlet valve to a pressure accumulator, so that a volume of fluid applied by the first generator of brake pressure can be diverted via the first outlet valve into the pressure accumulator. The first generator of brake pressure can be connected to the pressure accumulator via a further hydraulic connection having a second actuatable outlet valve. A method for operating a brake system is also disclosed.

17 Claims, 7 Drawing Sheets

(51) Int. Cl.
*B60T 8/26* (2006.01)
*B60T 8/48* (2006.01)
*B60T 8/50* (2006.01)
*B60T 13/14* (2006.01)

(56) References Cited

U.S. PATENT DOCUMENTS

| | | | |
|---|---|---|---|
| 7,837,280 B2 * | 11/2010 | Okano et al. | 303/113.5 |
| 8,123,310 B2 | 2/2012 | Haupt et al. | |
| 8,414,089 B2 * | 4/2013 | Feigel et al. | 303/113.1 |
| 2002/0011362 A1 * | 1/2002 | Toda | 180/65.2 |
| 2009/0212622 A1 | 8/2009 | Yang | |
| 2010/0206673 A1 | 8/2010 | Hitzel et al. | |
| 2010/0244547 A1 | 9/2010 | Gilles et al. | |
| 2012/0056471 A1 | 3/2012 | Plewnia et al. | |

FOREIGN PATENT DOCUMENTS

| | | |
|---|---|---|
| DE | 10 2004 010 265 A1 | 5/2005 |
| DE | 10 2007 043 592 A1 | 5/2008 |
| DE | 10 2006 060 434 A1 | 6/2008 |
| DE | 10 2007 028 070 A1 | 12/2008 |
| DE | 10 2008 039 960 A1 | 3/2009 |
| DE | 10 2009 007 494 A1 | 9/2009 |
| DE | 10 2009 009 647 A1 | 8/2010 |
| WO | WO 94/25322 | 11/1994 |
| WO | WO 00/66410 | 11/2000 |
| WO | WO 2004/101308 A1 | 11/2004 |

OTHER PUBLICATIONS

German Search Report for DE 2011 017 595.4 mailed Jul. 29, 2011.

* cited by examiner

BRAKE SYSTEM FOR A MOTOR VEHICLE AND METHOD FOR OPERATING A BRAKE SYSTEM

CROSS REFERENCE TO RELATED APPLICATIONS

This application is the U.S. National Phase Application of PCT/EP2011/056637, filed Apr. 27, 2011, which claims priority to German Patent Application No. 10 2010 028 261.8, filed Apr. 27, 2010, the contents of such applications being incorporated by reference herein.

FIELD OF THE INVENTION

The invention relates to a brake system for a motor vehicle, which comprises, on at least one wheel, an electric-regenerative brake and a friction brake that can be hydraulically actuated by a first means for generating a brake pressure using a fluid and a method for the open or closed-loop control of a brake system for a motor vehicle, which comprises, on at least one wheel, an electric-regenerative brake and a friction brake that can be hydraulically actuated by a first means for generating a brake pressure using a fluid.

BACKGROUND OF THE INVENTION

Motor vehicles, the drive and brake systems of which comprise one or more electric machines, are gaining increasingly in importance. Here the electric machine is often used as drive, provided that a battery of the motor vehicle has stored sufficient electrical energy. It is desirable, with a view to the range of the electric drive, for example, to charge the battery or batteries of the motor vehicle not only when the vehicle is stationary but also whilst the motor vehicle is in operation. If the electric machine is operated as a generator, it is possible when braking the motor vehicle to obtain electrical energy by converting the kinetic energy or rotational energy of the axle (and the wheels attached thereto), which is connected to the electric drive, and to store this in the battery.

The brake torque built up through the recuperation, that is to say the recovery of electrical energy by a generator, varies as a function of the speed of the motor vehicle and the battery level. In order to be able to apply sufficient braking deceleration in every eventuality, brake systems for hybrid vehicles, for example, which combine an electric drive with an internal combustion engine, comprise additional brake devices besides the electric-regenerative brake (the electric drive operated as generator). These additional brake devices, which are usually incorporated in two statutorily prescribed brake circuits, comprise electro-mechanical, hydraulic and/or electro-hydraulic friction brakes, for example.

The interaction, in particular, of hydraulic friction brakes and a generator, which is desirable owing to the low system costs and moderate system complexity, presents some technical challenges: for an efficient recuperation the maximum brake torque of the generator possible in any given driving situation should be utilized. Furthermore a transition ("blending") between a braking of the motor vehicle by the braking deceleration of the generator and a braking of the motor vehicle by friction brakes should be possible without the occurrence of jerky variations in the braking deceleration or an unfavorable brake force distribution. It is also necessary to avoid giving the driver an unusual pedal feel due to the decoupling of the electric-regenerative braking by the generator from the brake pedal, which makes it difficult for him to assess what braking effect he has achieved.

DE 196 04 134 A1, which is incorporated by reference, proposes a method and a device for controlling the brake system of vehicles having an electric drive, in which, in a first range of the driver braking requirement, the brake torque is applied almost exclusively by the regenerative braking. Here the pressure which the driver generates by actuating the brake pedal is reduced, in that the fluid flowing into the wheel brake cylinders is returned to an accumulator chamber by a corresponding control of the outlet valves. A development of this brake system is disclosed, for example, by WO 2004/101308 A1, which is incorporated by reference.

The brake systems hitherto described have the disadvantage, however, that in filling the accumulator chamber or the pressure accumulator fluid acts upon at least one wheel brake in each brake circuit. There is therefore always some deceleration of the vehicle by the friction brakes, which limits the efficiency of the recuperation, that is to say the proportion of the energy recovered by the generator during braking is reduced.

SUMMARY OF THE INVENTION

An aspect of the present invention, therefore, aims to provide a brake system and a method which affords the most efficient recuperation possible consistent with a comfortable pedal feel for the driver and a low system complexity. For this purpose the aim was to have the facility, in a first deceleration range, for applying the overall deceleration of the vehicle, which is generally composed of deceleration components supplied by the friction brakes and by the electric-regenerative brake, entirely by means of the electric-regenerative brake.

According to the invention this is desirably achieved by a brake system for a motor vehicle, which comprises, on at least one wheel, an electric-regenerative brake and a friction brake that can be hydraulically actuated by a first means for generating a brake pressure using a fluid, wherein the friction brake can be connected via an actuatable inlet valve to the first means for generating a brake pressure and via a first actuatable outlet valve to a pressure accumulator, so that a volume of fluid applied by the means for generating a brake pressure can be diverted via the first outlet valve into the pressure accumulator, wherein the first means for generating a brake pressure can be connected to the pressure accumulator via a further hydraulic connection having a second actuatable outlet valve and a method for the open or closed-loop control of a brake system for a motor vehicle, which comprises, on at least one wheel, an electric-regenerative brake and a friction brake that can be hydraulically actuated by a first means for generating a brake pressure using a fluid, wherein the friction brake can be connected via an actuatable inlet valve to the first means for generating a brake pressure and via a first actuatable outlet valve to a pressure accumulator, so that a volume of fluid applied by the first means for generating a brake pressure can be diverted via the first outlet valve into the pressure accumulator, wherein during a regenerative braking process a volume of fluid applied by the first means for generating a brake pressure is discharged into the pressure accumulator via a second actuatable outlet valve, which is arranged in a further hydraulic connection between the means for generating a brake pressure and the pressure accumulator.

A brake system for a motor vehicle is therefore provided, which comprises, on at least one wheel, an electric-regenerative brake and a friction brake that can be hydraulically actuated by a first means for generating a brake pressure using a fluid, wherein the friction brake can be connected via an actuatable inlet valve to the first means for generating a brake pressure and via a first actuatable outlet valve to a pressure accumulator, so that a volume of fluid applied by the means for generating a brake pressure can be diverted via the first outlet valve into the pressure accumulator. According to the invention the first means for generating a brake pressure can be connected to the pressure accumulator via a further hydraulic connection having a second actuatable outlet valve.

The first means for generating a brake pressure is preferably embodied as a brake master cylinder or tandem master cylinder actuated by a brake pedal, a brake booster being optionally connectable to this on the inlet side. Alternatively or in addition the means for generating a brake pressure preferably comprises a cylinder-piston arrangement, the piston of which can be actuated by an electromechanical actuator. An, actuatable valve is here taken to mean, in particular, a hydraulic valve, which comprises a coil, which is supplied with a current for switching the valve. An actuatable valve is preferably embodied as a hydraulic valve that is electrically actuated by a solenoid and in this case may be actuatable both by analog means and also digitally. Actuatable by analog means is here taken to imply that the opening of the valve varies reproducibly with the control variable applied (in particular the solenoid current), whereas a digitally actuatable valve is used only for opening and closing.

Diverting the volume of fluid into a pressure accumulator means that a slight actuation of the brake pedal by the driver produces a pure or virtually pure electric-regenerative braking, thereby ensuring both an efficient recuperation and a comfortable pedal feel for the driver (due to the "fluid consumption" corresponding to friction braking). The quantity of fluid stored may later be used for the "blending", that is to say a gentle transition between braking of the motor vehicle due to the braking deceleration of the generator and a braking of the motor vehicle by friction brakes. Since the pressure accumulator can be filled via the second actuatable outlet valve, that is to say a separate actuatable hydraulic valve, the number of actuations, at least of the outlet valves of the friction brakes, is reduced. The service life of the brake system is consequently prolonged.

In order to be able discharge fluid into the pressure accumulator as easily as possible via an actuatable hydraulic valve, which is preferably embodied as a normally closed NC valve, the pressure accumulator is preferably embodied as a low-pressure accumulator, in contrast to the hydraulic system of the brake system. Owing to the pressure differential, only one hydraulic valve has to be opened in order to divert fluid into the pressure accumulator.

Fluid is suitably diverted into the pressure accumulator(s), which are also used for building up pressure, for example during a wheel-slip control. This limits the number of additional components required.

The further hydraulic connection preferably branches off between the first means for generating a brake pressure and the inlet valve. Fluid can consequently be diverted into the pressure accumulator even when the friction brakes are isolated. Since the friction brakes are suitably isolated from the means for generating a brake pressure, no deceleration is built up by the friction brakes, thereby maximizing the electrical energy generated by the generator.

It is advantageous if a further actuatable valve is arranged between the first means for generating a brake pressure and the inlet valve, and the first means for generating a brake pressure can be connected to the pressure accumulator via the further actuatable valve and the second outlet valve. This affords greater flexibility of the components hydraulically connected according to the activation of the brake system.

The brake system suitably comprises a second means for generating a brake pressure, in particular an engine-pump unit or a hydraulic pump, which serves to transport fluid from the pressure accumulator into the friction brake. A brake torque can therefore be generated independently of the driver. This allows both a driving stability control and also compensation for a reduction of the electric-regenerative braking deceleration, which occurs, for example, below a certain minimum speed (typically 10 km/h).

Each of the pressure accumulators is advantageously connected on the outlet side to a second means for generating a brake pressure (for example an engine-pump unit). In the event of a redistribution of the brake torque from the electric-regenerative brake to the friction brakes the volumetric pressure of the fluid needed for this purpose is delivered into the corresponding hydraulic lines of the friction brakes from the pressure accumulator via the second means for generating a pressure. Any influence on the first means for generating a brake pressure is suitably prevented in that this is isolated from the friction brakes by hydraulic valves.

The second means for generating a brake pressure is preferably arranged in parallel with the second outlet valve between the pressure accumulator and the first means for generating a brake pressure. By closing the further actuatable valve, the friction brake and the second means for generating a brake pressure can be completely isolated from the first means for generating a brake pressure, thereby preventing any reactive effects on the first means for generating a brake pressure.

It is especially preferred if an additional actuatable valve, in particular a normally closed valve, is arranged between the intake or inlet side of the second means for generating a brake pressure and the first means for generating a brake pressure. An additional hydraulic path is therefore available for supplying fluid to the second means for generating a brake pressure.

A pressure sensor is preferably fitted to at least one friction brake in each brake circuit. Measuring the pressure in a friction brake arranged on a wheel allows the brake torque to be metered more precisely, for example in the case of wheel-slip control.

According to a preferred embodiment of the invention friction brakes that can be hydraulically actuated using a fluid are arranged on the wheels of a first axle of the vehicle, in particular the front axle, whilst electromechanically actuatable friction brakes are arranged on the wheels of a second axle of the vehicle, in particular the rear axle. Since a less powerful brake torque needs to be built up on the rear axle than on the front axle, the voltage can continue to be supplied by the usual vehicle battery. In particular the electric-regenerative brake is arranged on the front axle, since this allows a powerful deceleration by the generator without jeopardizing the driving stability.

In an alternative preferred embodiment of the invention friction brakes that can be hydraulically actuated using a fluid are arranged on all wheels of the vehicle, each two friction brakes being combined in one brake circuit.

According to an especially preferred embodiment of the invention the first brake circuit is assigned to the front axle and the second brake circuit to the rear axle of the motor vehicle. In particular, only one of the two brake circuits comprises the second outlet valve according to the invention. The number of additional components required is therefore reduced.

In an alternative especially preferred embodiment of the invention a friction brake of a front wheel and a friction brake of a diagonally opposing rear wheel are in each case combined in one brake circuit, and each brake circuit comprises a second actuatable outlet valve and a pressure accumulator. A pure electric-regenerative deceleration is therefore possible, that is to say the efficiency of the recuperation is maximized, even in the case of a diagonally split brake system.

It is advantageous if the brake system comprises a driving dynamics control, which controls the wheel-slip and/or yaw behavior of the vehicle. The handling safety of the vehicle is therefore increased.

It is particularly advantageous if the electric-regenerative brake is activated by the driving dynamics control. Recuperation can therefore take place even in the case of braking independent of the driver.

The invention also relates to a method for the open or closed-loop control of a brake system for a motor vehicle, which comprises, on at least one wheel, an electric-regenerative brake and a friction brake that can be hydraulically actuated by a first means for generating a brake pressure using a fluid, wherein the friction brake can be connected via an actuatable inlet valve to the first means for generating a brake pressure and via a first actuatable outlet valve to a pressure accumulator, so that a volume of fluid applied by the first means for generating a brake pressure can be diverted via the first outlet valve into the pressure accumulator. According to the invention, during a regenerative braking process a volume of fluid applied by the first means for generating a brake pressure is discharged into the pressure accumulator via a second actuatable outlet valve, which is arranged in a further hydraulic connection between the means for generating a brake pressure and the pressure accumulator. A pedal feel agreeable to the driver is therefore ensured.

In order to simulate precisely the corresponding braking performance as would occur with friction brakes, precisely the fluid volume of fluid as would be taken up by the friction brakes, if the brake torque applied by an electric-regenerative brake were to be applied solely by the hydraulic friction brakes, is advantageously diverted into the pressure accumulator(s).

For discharging volumes of fluid into the pressure accumulator the inlet valve is preferably closed and the second outlet valve is opened. This makes it possible to maximize the efficiency of the recuperation.

It is advantageous, particularly for selective engagement of the friction brake in a regenerative braking process, if the second outlet valve is closed, the inlet valve is opened and the first outlet valve remains or is closed. It is thereby possible to increase the build-up of brake torque with little effort.

The filling of the pressure accumulator(s) is suitably terminated when a predefined degree of actuation of a brake actuating pedal is reached, the predefined degree being detected, in particular, by means of a pedal angle sensor or a travel sensor on the tandem master cylinder, and corresponding to a predefined value of the brake torque delivered by the electric-regenerative brake or brakes, in particular a maximum brake torque delivered by the electric-regenerative brake or brakes. The brake system can easily be controlled on the basis of such a signal.

It is advisable in the case of multi-circuit hydraulic brake systems for the quantity of fluid diverted into the pressure accumulator(s) to be adjusted according to the splitting of the brake circuits. For diagonally split brake circuits it is particularly suitable if the pressure accumulators each take up the same quantity of fluid. It is particularly suitable if the pressure accumulator of a brake circuit assigned to the front axle stores a greater quantity of fluid than the pressure accumulator of a brake circuit assigned to the rear axle, the ratio for which should lie, in particular, in the range 80:20 to 66:33.

If the braking deceleration called for by the driver exceeds the maximum deceleration provided by the generator, the hitherto isolated friction brake(s) is/are preferably reconnected to the first means for generating a brake pressure, so that the deceleration shortfall is provided by friction. In an especially preferred embodiment of the invention this connection of the hitherto isolated friction brake(s) to the first means for generating a brake pressure only occurs when the braking deceleration called for by the driver exceeds the maximum deceleration provided by the generator by a predefined threshold value, which lies, in particular, in the range from 0.0 g to 0.5 g (g denotes the acceleration due to gravity). An opening of the inlet valve of the isolated friction brake(s) may be necessary due to a high deceleration requirement or due to a diminishing generator deceleration at low speeds.

In order to build up brake pressure in the friction brake, fluid is suitably transported out of the pressure accumulator into the friction brake by a second means for generating a brake pressure, in particular an electrically driven hydraulic pump, the second means for generating a brake pressure being arranged in parallel with the second outlet valve between the pressure accumulator and the means for generating a brake pressure. This active build-up of additional brake pressure may be advantageous because of a high deceleration requirement or on account of diminishing generator deceleration at low speeds.

On termination of a regenerative braking process the pressure accumulator is preferably drained by opening of the first outlet valve or the second outlet valve. It is therefore ensured that in future braking processes the fluid can be diverted into the pressure accumulator without any delay.

When the speed of the motor vehicle is less than a predefined minimum speed, braking is preferably performed solely by friction brakes. At speeds of less than 10 km/h, for example, the deceleration built up by the generator diminishes sharply.

It is advantageous if braking solely by means of friction brakes occurs as soon as the deceleration required exceeds a predefined threshold. This avoids jeopardizing the driving stability due to an unfavorable brake force distribution and facilitates the intervention of a wheel-slip control.

The brake pedal preferably comprises a pedal actuation sensor, for example in the form of a pedal travel sensor or a pedal angle sensor. Alternatively or in addition the brake system preferably comprises a pressure sensor, which is arranged in brake line leading to the means for generating a pressure (for example the master cylinder). From the pedal actuation—sensor and/or the pressure sensor it is possible to detect the actuation and/or the degree of actuation of the brake pedal. The signal from the pedal actuation sensor and/or the pressure sensor is preferably used for open or closed-loop control of the brake system.

In a preferred embodiment of the invention a plausibility check is performed on the signals from the pedal actuation sensor on the basis of a measurement of the position of the first means for generating a brake pressure, this being measured in particular by an inductive sensor. In an alternative preferred embodiment of the invention a reliable detection of the driver's intention is ensured by fitting an additional switch at a suitable position affixed to the pedal or to a piston of the tandem master cylinder and activating it when the brake pedal is in a specific position. In a further alternative embodiment of the invention a plausibility check is performed on the data from the pedal angle sensor, by checking whether the pressure in the first means for generating a brake pressure and/or the quantity of fluid in one of the pressure accumulators exceeds a value corresponding to the relevant pedal position.

The brake system preferably comprises an electronic control unit, which evaluates the available information, for example from the pedal actuation sensor and/or the pressure sensor and/or the generator torque, and activates the actuatable valves and if necessary the second means for generating a brake pressure accordingly.

BRIEF DESCRIPTION OF THE DRAWINGS

The invention is best understood from the following detailed description when read in connection with the accompanying drawing. Included in the drawing is the following figure.

Figure 1:
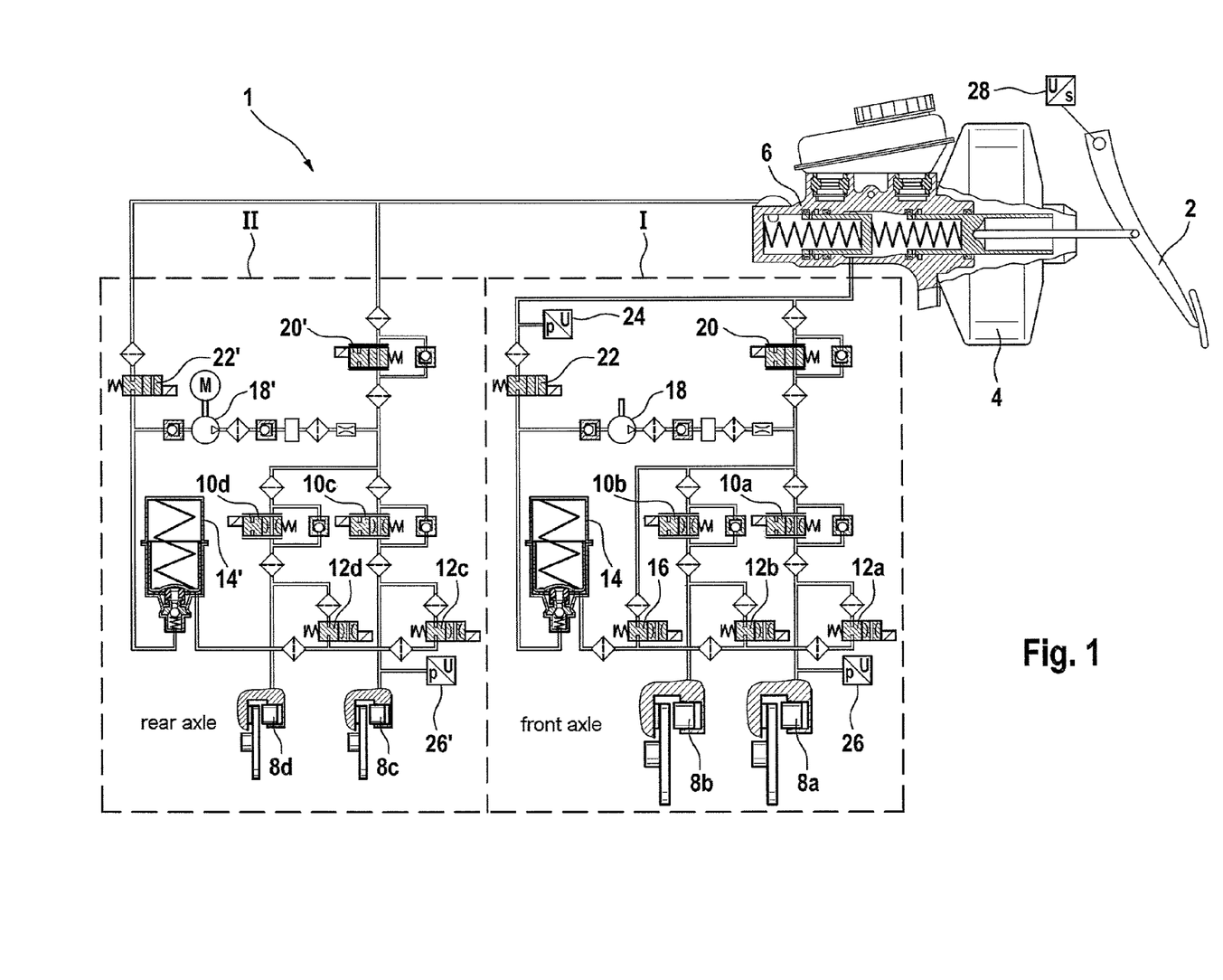
FIG. 1 shows an example of a brake system in a state of rest.

FIG. 1 represents a schematic circuit diagram of a brake system 1 for a motor vehicle. The exemplary brake system comprises two brake circuits I, II, each two friction brakes 8a, 8b and 8c, 8d of the vehicle being combined in one brake circuit I, II. The driver of the motor vehicle enters the deceleration requirement via the brake pedal 2. In order to build up a brake torque by means of the friction brakes 8 the brake system 1 is provided with a first means 6 for generating a brake pressure, which is preferably embodied as a tandem master cylinder 6 with vacuum brake booster 4. Here the brake pressure applied by the tandem master cylinder 6 is transmitted by hydraulic lines containing a fluid to the friction brakes 8. The first brake circuit I is connected, for example, to the friction brakes 8a, 8b of the front axle VA, the friction brakes 8c, 8d of the rear axle HA being connected to the second brake circuit II. Alternatively the brake system may also have a diagonal brake circuit split and/or a tandem master cylinder 6 without servo assistance, that is to say with no brake booster 4.

In the example represented in FIG. 1 the two brake circuits I, II have partially identical hydraulic components, for which reason only the first brake circuit I and the differences are described below. A brake line emerging from the brake master cylinder 6 branches downstream of a normally open isolating valve (TV) 20 into two brake lines leading to the friction brakes 8a, 8b of the front axle VA, in each of which a normally open (i.e. in the absence of electrical activation) inlet valve (NO-valve) 10a, 10b is provided. Between each inlet valve (NO-valve) 10a, 10b and the corresponding wheel brake 8a, 8b a return line, in which a normally closed outlet valve (NC-valve) 12a, 12b is arranged, emerges from the respective brake line. Both return lines are connected via a common brake line segment to a pressure accumulator 14. Brake circuit I comprises a high-pressure generating pump (engine-pump unit) 18 powered by an electric drive motor (second means for generating a brake pressure). This pump is connected on the suction side to the pressure accumulator 14. On the output side the pump 18 is connected to the brake line between the isolating valve 20 and the inlet valves 10. Between the brake pressure accumulator 14 and the pump 18 a further brake line leads via a normally closed electronic switching valve (EUV) 22 to the brake line between the brake master cylinder 6 and the isolating valve 20. According to the invention brake circuit I comprises an additional outlet valve 16, which is capable of switching a further hydraulic connection between the brake line downstream of the isolating valve 20 and the pressure accumulator 14. Brake circuit II also suitably comprises an additional outlet valve, particularly in the case of a diagonally split brake system. Even with the inlet valves 10a, 10b closed, therefore, fluid can be diverted into the pressure accumulator.

The brake system 1 is a regenerative brake system, which besides the hydraulically actuated friction brakes 2 also comprises one or more electric machine(s) (not shown), which are operated as generators in order to generate electrical energy.

The degree of brake pedal actuation is registered via a travel sensor 28, which is arranged on the brake pedal 6. In principle, however, it is also possible to use other sensors which deliver a signal proportional to the brake actuation by the driver. In addition a pressure sensor 24 is provided, which is situated on the hydraulic line of the brake circuit I leading to the tandem master cylinder 6 and which measures the upstream pressure. In a preferred embodiment of the invention the fluid pressure on the friction brakes 8 is determined by pressure sensors 26, 26', which are each arranged in a hydraulic line of wheel brake 8a, 8c. In an alternative preferred embodiment of the invention the pressure in the friction brakes is estimated from a model known in the art.

For open and/or closed-loop control of the brake system 1 the system comprises an electronic control unit 30, which activates the electronically controllable hydraulic valves 10, 12, 16, 20, 22 and the pump 18. In order to achieve a brake feel via the brake pedal 2 that is as comfortable as possible for the driver, fluid can be diverted into the two pressure accumulators 14 (NDS: low-pressure accumulator) whilst the generator is in operation. Fluid present in the pressure accumulators 14 may be delivered into the friction brakes 8 by means of the pump 18, so that an additional brake torque is built up in the friction brakes.

Figure 2:
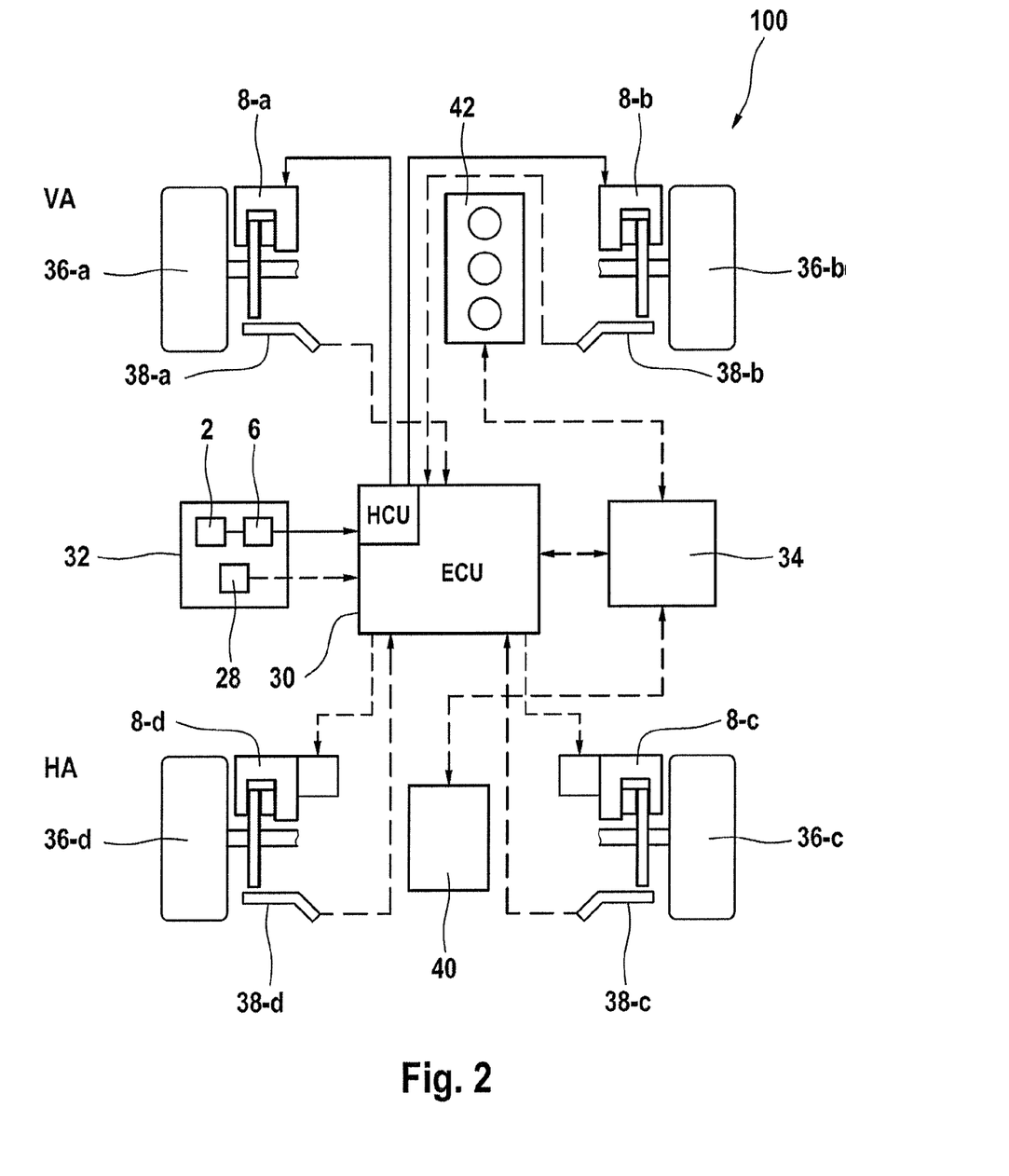
FIG. 2 shows a schematic representation of a motor vehicle.

FIG. 2 shows a motor vehicle 100, which comprises a brake system suitable for performing the method according to the invention. The vehicle taken as an example is a hybrid vehicle, which comprises an internal combustion engine 42 and one or more electric drive motors 40, which can be activated as generators for charging the battery, in order to charge up one or more vehicle batteries (not shown). For controlling the electric drive 40, a motor control unit 34 is provided here, which is connected to the electronic control unit ECU in the brake control module 30 (which also comprises a hydraulic control unit HCU covering the valves 10, 12, 16, 20, 22). In the example shown the electric-regenerative brake 40 (that is to say the electric drive operated as generator) acts on the rear axle HA of the vehicle. For the brake system and method according to the invention, however, it is basically irrelevant which of the wheels 36a, 36b, 36c, 36d are braked by regenerative braking in addition to the friction brakes 8a, 8b, 8c, 8d. The steps of the method described below basically do not vary according to this.

A braking requirement on the part of the driver is detected via a brake actuation unit 32, which comprises a brake pedal 2, a first means 6 for generating a brake pressure, in particular a tandem master cylinder, and a pedal travel or pedal angle sensor 28. This unit transmits fluid (represented as a solid line) and electrical signals (represented as a dashed line) to the electronic control unit ECU of the brake control module 30. FIG. 2 represents an embodiment of the brake system according to the invention, which has electromechanical (friction) brakes on the rear axle instead of hydraulic friction brakes. The vehicle further comprises wheel speed sensors 38a, 38b, 38c, 38d, which likewise send their signals to the electronic control unit 30, so that, for example, a wheel-slip control can be applied to the brake pressure in the individual friction brakes 8a, 8b, 8c, 8d.

The electronic control unit 30 and the motor control unit 34 exchange information needed for electric-regenerative braking, such as the instantaneous vehicle speed and the instantaneously available generator deceleration. Here, during a braking process, braking deceleration may be required of the generator. In an alternative embodiment a motor vehicle suitable for performing the method according to the invention comprises an electric vacuum pump, which supplies a vacuum brake booster 4 with a vacuum, in order to operate the tandem master cylinder 6 with servo assistance.

In an alternative preferred embodiment of the invention the brake system comprises a second sensor element for registering a brake pedal actuation, which is independent of the brake pedal travel sensor or angle sensor 28. If the brake pedal actuation attains a predefined valve, this second sensor element is advantageously activated and in particular terminates a filling process of a pressure accumulator (for example by closing the additional outlet valve(s) 16). This ensures a correct detection of the driver braking requirement should the signal from the brake pedal travel sensor 28 be defective, for example due to mechanical damage of the sensor 28. The second sensor element could also be arranged on the piston of the spindle circuit of the master cylinder or on the brake pedal (like a brake light switch element, although with a delayed switching point).

Figure 3:
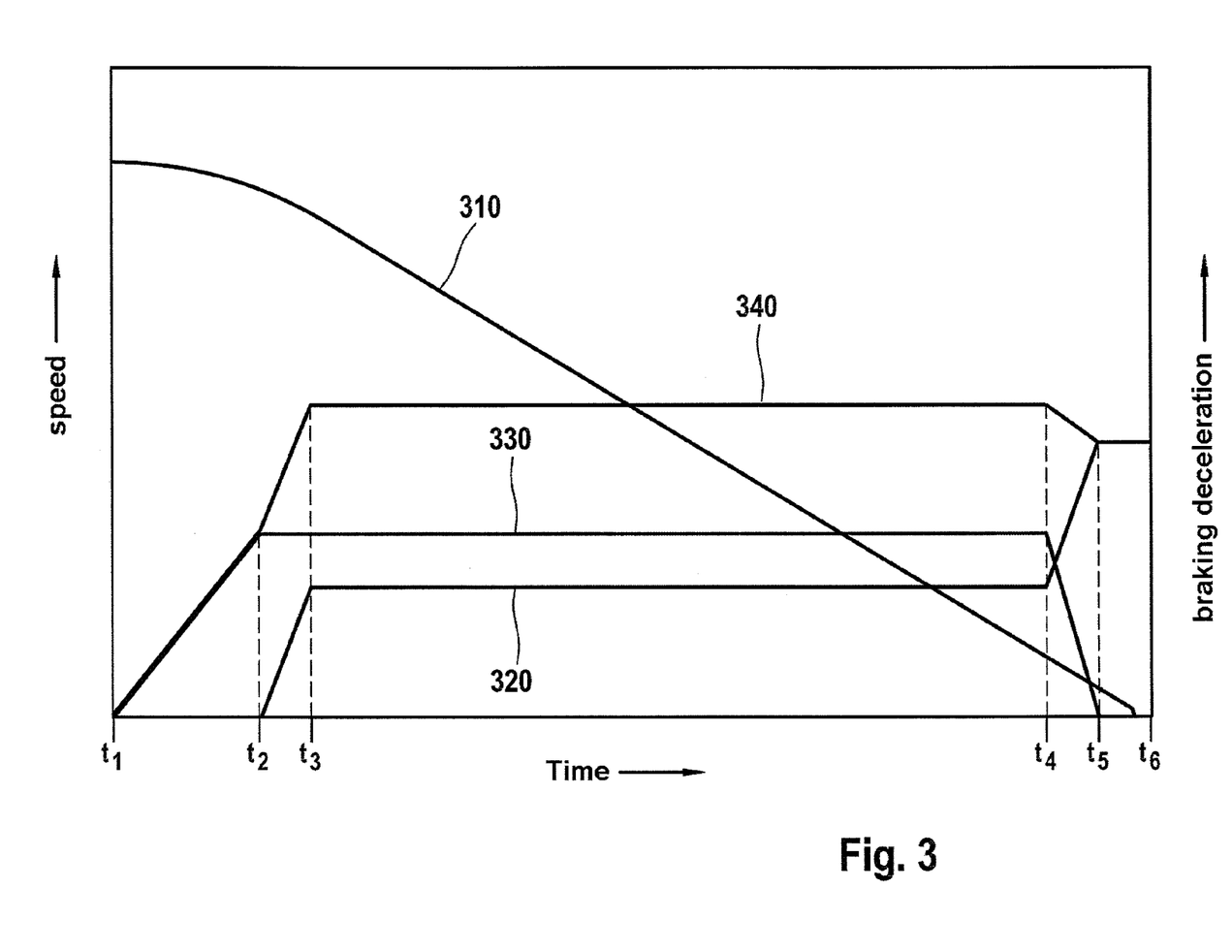
FIG. 3 shows the time sequence in an example of a braking process.

FIG. 3 shows the sequence in an example of a braking process. The time is plotted as abscissa; the ordinate indicates the speed of the motor vehicle and the instantaneous braking deceleration. The vehicle speed is represented as line 310, the braking deceleration by the generator as line 330, the braking deceleration by the friction brakes as line 320. Line 340 indicates the resulting overall deceleration. In the course of the braking process, which begins at time $t_1$ and ends at time $t_6$, the vehicle is braked to a standstill. Here a deceleration of the vehicle at first ensues only through the electric-regenerative brake. For this purpose, between $t_1$ and $t_2$ the fluid is diverted from the friction brakes into pressure accumulators. At time $t_2$ the filling of the pressure accumulator(s) is terminated and the hitherto isolated wheel brake is reconnected to the tandem master cylinder. Up to time $t_3$ the driver presses more heavily on the brake pedal and then maintains the pedal position. The additional deceleration required is here provided by the friction brakes, whilst the generator braking deceleration remains constant. At time $t_4$ the speed of the automobile has fallen to such an extent that the generator deceleration diminishes. Between $t_4$ and $t_5$ a blending process therefore ensues, in which additional brake pressure is built up and the electric-regenerative deceleration is continuously reduced ("ramp-out"). The stationary state of the vehicle is reached at time $t_6$. The steps in the method for operating the brake system are explained below with reference to FIG. 4-7.

If the braking process is terminated by the driver without a blending process being required, the pressure accumulators are drained by opening of the outlet valves 12. Complete draining is then ensured through repeated brief actuation of the electronic switching valve(s) 22.

Figure 4:
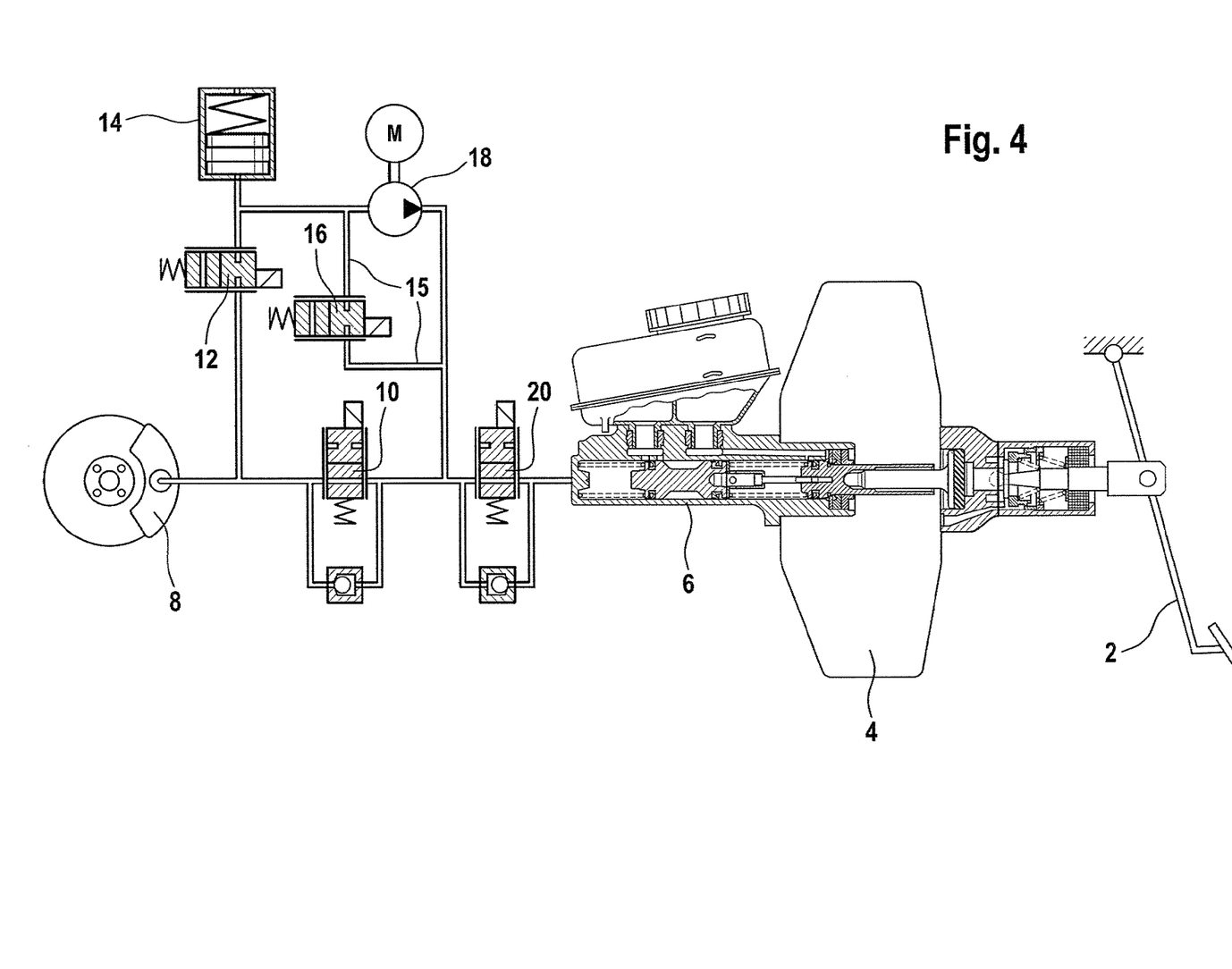
FIG. 4-7 show steps in an exemplary method.
Figure 5:
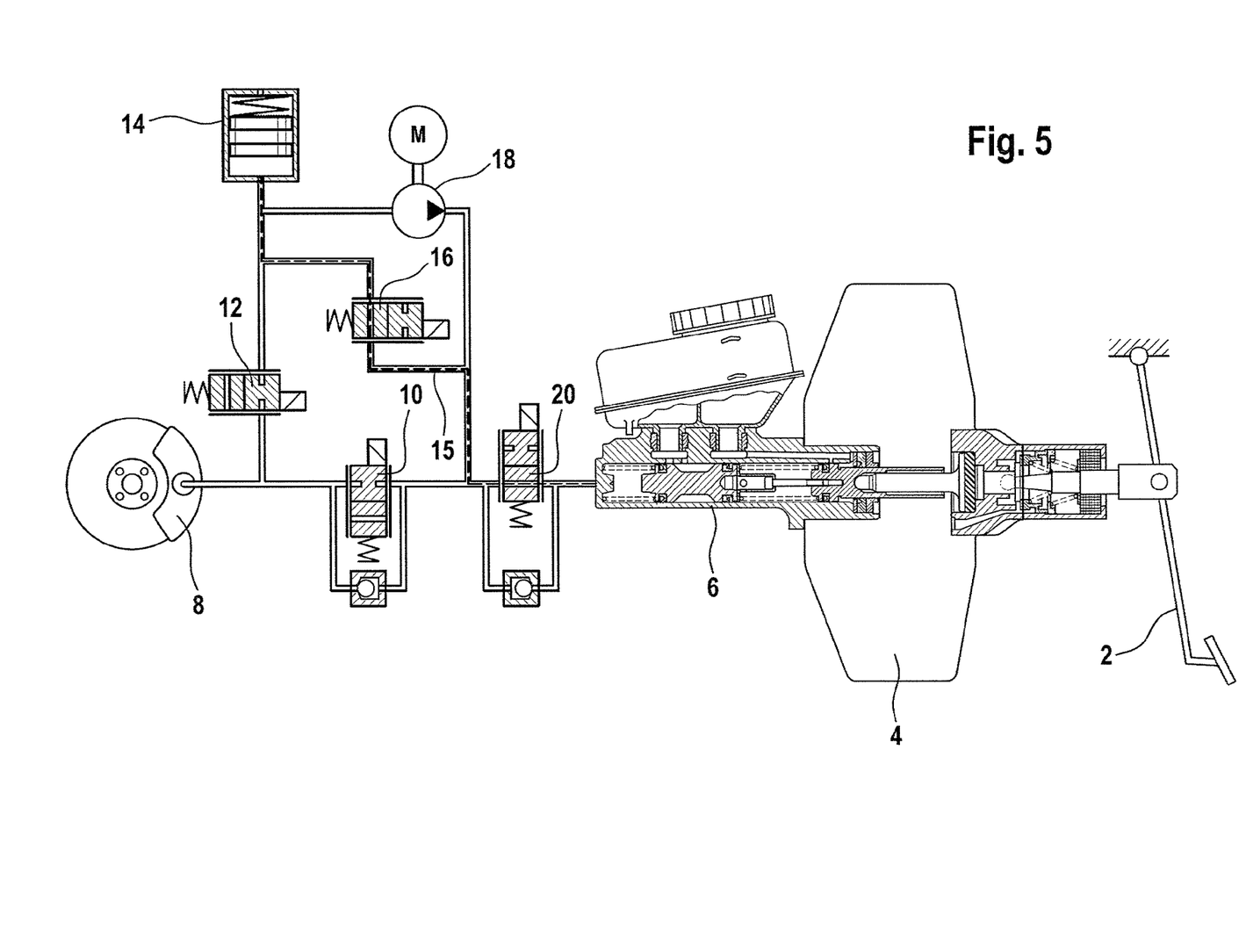

FIG. 4 shows a simplified brake circuit of the brake system according to the invention in a state of rest, that is to say the state in the absence of electrical activation of the hydraulic components, when the driver has not actuated the brake pedal. The numbering of the hydraulic components corresponds to FIG. 1. In order to give a better overview only one wheel brake is represented, that is to say, compared to brake circuit I in FIG. 1, the second wheel brake and the electronic switching valve 22 are absent.

If the first means 6 for generating a brake pressure is actuated by means of the brake pedal 2, a purely regenerative braking is at first performed, provided that the driving situation and the operating state of the vehicle allow this. Here the wheel is braked by the operation of the generator (not shown), generating electrical energy. The volume of fluid applied by the means 6 for generating a brake pressure is diverted into the pressure accumulator 14 through closing of the inlet valve 10 and opening of the second outlet valve 16, without fluid acting on the friction brake 8. This actuation of the brake system in the recuperation mode is represented schematically in FIG. 5.

Figure 6:
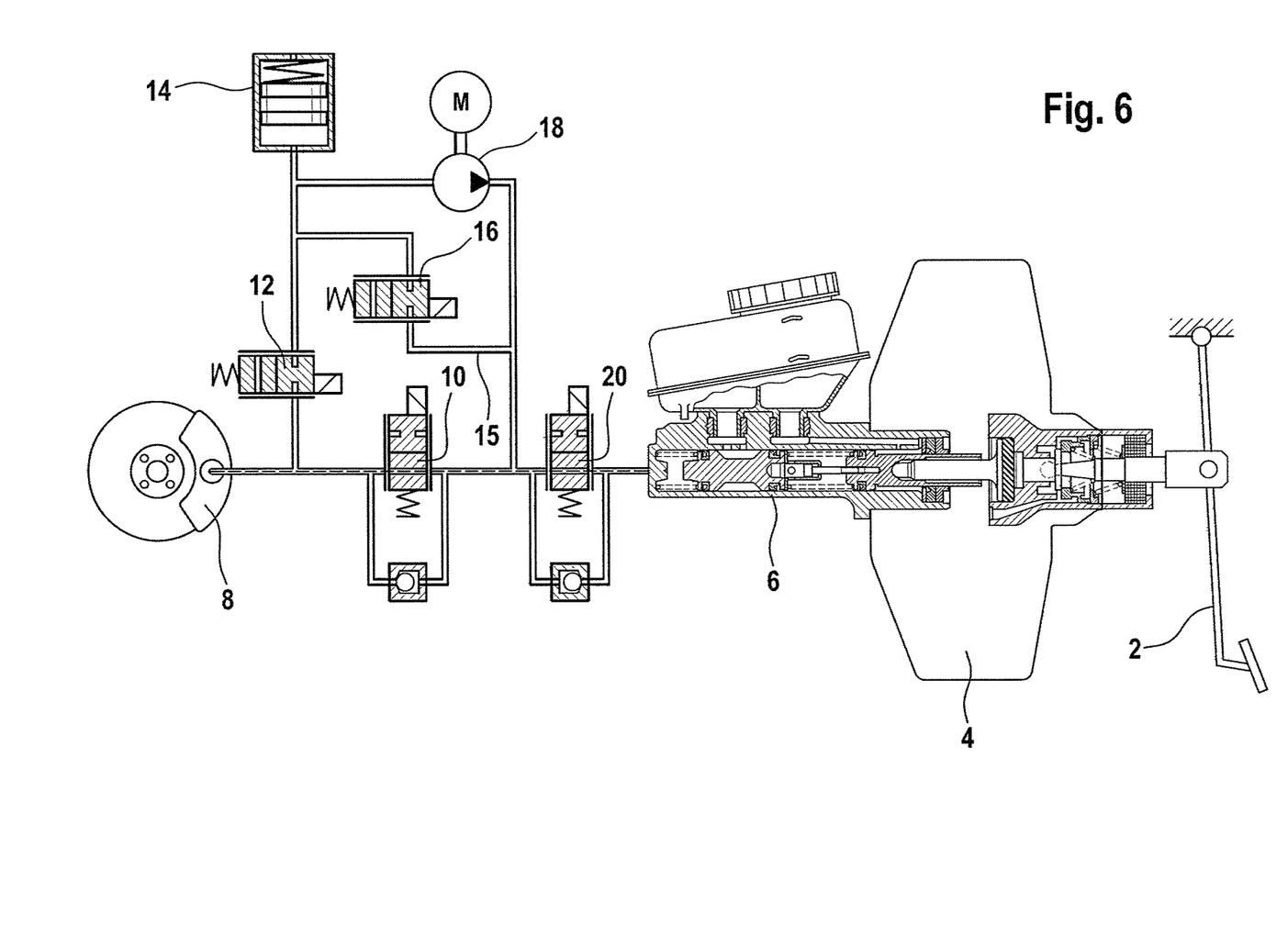
Figure 7:
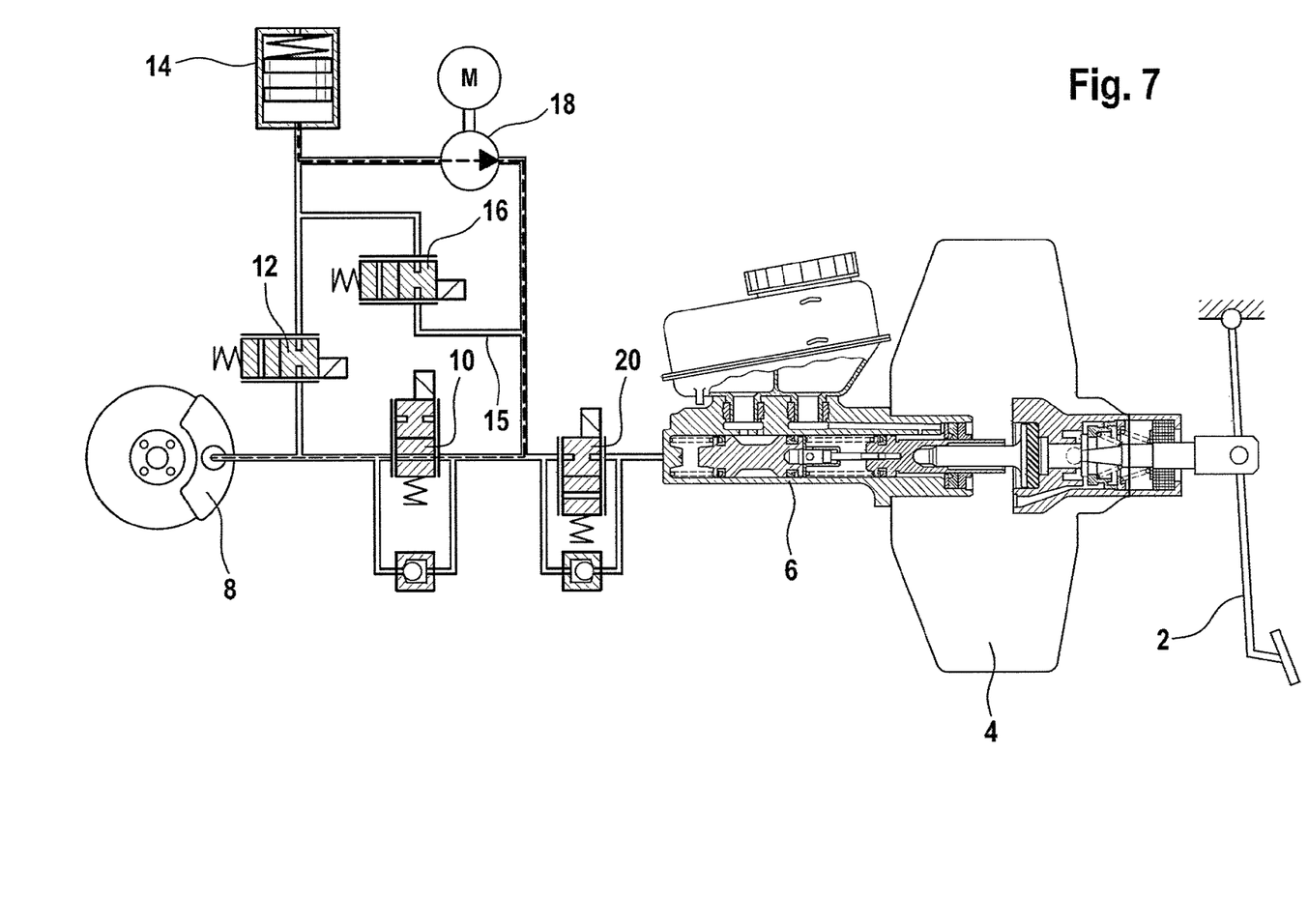

If the braking requirement by the driver exceeds the brake torque that can be delivered by the generator, the friction brake 8 is switched on to augment the regenerative brake or superimposed thereon. For this purpose the second outlet valve 16 is closed and the inlet valve 10 opened, as shown in FIG. 6. Under heavier actuation of the brake, fluid is now pressed into the friction brakes 2 by the means 6 for generating a brake pressure, which leads to a greater overall deceleration through the friction brake 8.

If the deceleration provided by the generator diminishes, a blending process ensues, in which a graduated or continuous build-up of the brake torque occurs due to the increasing action of the friction brakes. This blending is represented schematically in FIG. 7. For this purpose the isolating valve 20 is closed and the second means 18 for generating a brake pressure then activated. Fluid present in the pressure accumulator 14 is therefore delivered into the wheel brake 8 by means of the pump 18, resulting in a further increase of the brake pressure in the friction brake.

The invention claimed is:

1. A brake system for a motor vehicle, which comprises, on at least one wheel, an electric-regenerative brake and a friction brake that can be hydraulically actuated by a first means for generating a brake pressure using a fluid, wherein the friction brake can be connected via an actuatable inlet valve to the first means for generating a brake pressure and via a first actuatable outlet valve to a pressure accumulator, so that a volume of fluid applied by the means for generating a brake pressure can be diverted via the first outlet valve into the pressure accumulator, wherein the first means for generating a brake pressure can be connected to the pressure accumulator via a further hydraulic connection having a second actuatable outlet valve, wherein a further actuatable valve is arranged between the first means for generating a brake pressure and the inlet valve, and the first means for generating a brake pressure can be connected to the pressure accumulator via a connection including both the further valve and the second outlet valve without acting on any friction brake.

2. The brake system as claimed in claim 1, wherein the further hydraulic connection branches off between the first means for generating a brake pressure and the inlet valve.

3. The brake system as claimed in claim 1, further comprising a second means for generating a brake pressure, which serves to transport fluid from the pressure accumulator into the friction brake.

4. The brake system as claimed in claim 3, wherein the second means for generating a brake pressure comprises an engine-pump unit or a hydraulic pump.

5. The brake system as claimed in claim 3, wherein the second means for generating a brake pressure is arranged in parallel with the second outlet valve between the pressure accumulator and the first means for generating a brake pressure.

6. The brake system as claimed in claim 1, wherein friction brakes that can be hydraulically actuated using a fluid are arranged on the wheels of a first axle of the vehicle, whilst electromechanically actuatable friction brakes are arranged on the wheels of a second axle of the vehicle.

7. The brake system as claimed in claim 6, wherein the first axle of the vehicle is a front axle and the second axle of the vehicle is a rear axle.

8. The brake system as claimed in claim 1, wherein friction brakes that can be hydraulically actuated using a fluid are arranged on all wheels of the vehicle, with at least two of the friction brakes being combined in one brake circuit.

9. The brake system as claimed in claim 8, wherein a friction brake of a front wheel and a friction brake of a diagonally opposing rear wheel are in each case combined in one brake circuit, and the brake circuit comprises a respective second actuatable outlet valve and a pressure accumulator.

10. The brake system as claimed in claim 1, wherein the brake system comprises a driving dynamics control, which controls at least one of a wheel-slip and a yaw behavior of the vehicle.

11. The brake system as claimed in claim 10, wherein the electric-regenerative brake is activated by the driving dynamics control.

12. A method for the open or closed-loop control of a brake system for a motor vehicle, which comprises, on at least one wheel, an electric-regenerative brake and a friction brake that can be hydraulically actuated by a first means for generating a brake pressure using a fluid, wherein the friction brake can be connected via an actuatable inlet valve to the first means for generating a brake pressure and via a first actuatable outlet valve to a pressure accumulator, so that a volume of fluid applied by the first means for generating a brake pressure can be diverted via the first outlet valve into the pressure accumulator, wherein during a regenerative braking process a volume of fluid applied by the first means for generating a brake pressure is discharged into the pressure accumulator via a second actuatable outlet valve, which is arranged in a further hydraulic connection between the means for generating a brake pressure and the pressure accumulator, wherein a further actuatable valve is arranged between the first means for generating a brake pressure and the inlet valve, and the first means for generating a brake pressure can be connected to the pressure accumulator via a connection including both the further valve and the second outlet valve without acting on any friction brake.

13. The method as claimed in claim 12, wherein for discharging volumes of fluid into the pressure accumulator the inlet valve is closed and the second outlet valve is opened.

14. The method as claimed in claim 12, wherein, for selective engagement of the friction brake in a regenerative braking process, the second outlet valve is closed, the inlet valve is opened and the first outlet valve either remains closed or is closed.

15. The method as claimed in claim 12, wherein in order to build up brake pressure in the friction brake, fluid is transported out of the pressure accumulator into the friction brake by a second means for generating a brake pressure, the second means for generating a brake pressure being arranged in parallel with the second outlet valve between the pressure accumulator and the means for generating a brake pressure.

16. The method as claimed in claim 15, wherein the second means for generating a brake pressure is an electrically driven hydraulic pump.

17. The method as claimed in claim 12, wherein on termination of a regenerative braking process the pressure accumulator is drained by opening of the first outlet valve or the second outlet valve.

* * * * *